United States Patent
Wilson

(10) Patent No.: US 11,257,522 B2
(45) Date of Patent: *Feb. 22, 2022

(54) SYSTEMS AND METHODS FOR CREATING VIDEO EDITS

(71) Applicant: GoPro, Inc., San Mateo, CA (US)

(72) Inventor: Samuel Wilson, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/017,507

(22) Filed: Sep. 10, 2020

(65) Prior Publication Data

US 2020/0411054 A1 Dec. 31, 2020

Related U.S. Application Data

(63) Continuation of application No. 15/933,008, filed on Mar. 22, 2018, now Pat. No. 10,777,228.

(51) Int. Cl.
*G11B 27/02* (2006.01)
*G06N 3/08* (2006.01)
*G11B 27/031* (2006.01)

(52) U.S. Cl.
CPC ............... *G11B 27/02* (2013.01); *G06N 3/08* (2013.01); *G11B 27/031* (2013.01)

(58) Field of Classification Search
None
See application file for complete search history.

(56) References Cited

U.S. PATENT DOCUMENTS

| | | | |
|---|---|---|---|
| 6,535,639 B1 | 3/2003 | Uchihachi | |
| 7,739,599 B2 | 6/2010 | Patten | |
| 9,554,111 B2 | 1/2017 | Rav-Acha | |
| 9,792,502 B2 | 10/2017 | Newman | |
| 10,074,015 B1 | 9/2018 | Grundmann | |
| 2011/0292229 A1 | 12/2011 | Deever | |
| 2011/0292288 A1 | 12/2011 | Deever | |
| 2011/0293250 A1 | 12/2011 | Deever | |
| 2012/0033949 A1 | 2/2012 | Lu | |
| 2012/0163657 A1 | 6/2012 | Shellshear | |
| 2014/0096002 A1 | 4/2014 | Dey | |

(Continued)

FOREIGN PATENT DOCUMENTS

WO    2015109290 A1    7/2015

OTHER PUBLICATIONS

Andrej Karpathy Blog, "The Unreasonable Effectiveness of Recurrent Neural Networks", URL:http://karpathy.github.io/2015/05/21/rnn-effectiveness/ dated May 21, 2015 (31 pages).

(Continued)

*Primary Examiner* — Gelek W Topgyal
(74) *Attorney, Agent, or Firm* — Esplin & Associates, PC

(57) ABSTRACT

Feature information characterize features of video clips may be obtained. A given video clip may be selected as a segment of a video edit. Other video clips may be iteratively selected as other segments of the video edit based on the feature information of the video clips and recommended feature information of the segments. Recommended feature information of a particular segment may be obtained by processing feature information of a previously selected video clip through a trained recurrent neural network. Video edit information defining the video edit may be generated. The video edit may include the selected video clips as the segments of the video edit.

20 Claims, 8 Drawing Sheets

(56) References Cited

U.S. PATENT DOCUMENTS

| | | |
|---|---|---|
| 2015/0208023 A1 | 7/2015 | Boyle |
| 2015/0254871 A1 | 9/2015 | Macmillan |
| 2016/0055381 A1 | 2/2016 | Adsumilli |
| 2017/0316806 A1 | 11/2017 | Warren |
| 2018/0173958 A1 | 6/2018 | Hu |

OTHER PUBLICATIONS

Colah's blog "Understanding LSTM Networks" URL: http://colah.github.io/posts/2015-08-Understanding-LSTMs/ posted on Aug. 27, 2015 (10 pages).

video content 300 video clip A 302 video clip B 304 features A 303

Shaky: 0.3
Jumps: 0.1
Face: 0.6
Salient: 0.8
...
Motion: 0.9 features B 305

Shaky: 0.5
Jumps: 0.0
Face: 0.1
Salient: 0.4
...
Motion: 0.3 video clip C 306 video clip D 308 features C 307

Shaky: 0.8
Jumps: 0.4
Face: 0.3
Salient: 0.6
...
Motion: 0.5 features D 309

Shaky: 0
Jumps: 0.2
Face: 0.8
Salient: 0.2
...
Motion: 0.8

SYSTEMS AND METHODS FOR CREATING VIDEO EDITS

FIELD

This disclosure relates to creating video edits based on feature information and recommended feature information.

BACKGROUND

Video content may include moments of varying interest. Identifying and selecting segments of the video content for inclusion in a video edit may be difficult and/or time consuming.

SUMMARY

This disclosure relates to creating video edits. Feature information of video clips may be obtained. The video clips may include a first video clip, a second video clip, a third video clip, and/or other video clips. The feature information may characterize features of the video clips. The feature information may include first feature information of the first video clip, second feature information of the second video clip, third feature information of the third video clip, and/or other feature information. The first video clip may be selected as a first segment of a video edit of video content. At least some of the video clips may be iteratively selected as other segments of the video edit based on the feature information, recommended feature information, and/or other information.

Iterative selection of at least some of the video clips as the other segments of the video edit may include processing the first feature information through a recurrent neural network. The recurrent neural network may output first recommended feature information for a second segment of the video edit. The second segment may be adjacent to the first segment in the video edit. The second video clip may be selected as the second segment of the video edit based on a match between the first recommended feature information and the second feature information. The second feature information may be processed through the recurrent neural network. The recurrent neural network may output second recommended feature information for a third segment of the video edit. The third segment may be adjacent to the second segment in the video edit. The third video clip may be selected as the third segment of the video edit based on a match between the second recommended feature information and the third feature information.

Video edit information may be generated. The video edit information may define the video edit of the video content. The video edit may have a progress length. The video edit may include the selected video clips as the segments of the video edit. The selected video clips may include the first video clip as the first segment, the second video clip as the second segment, the third video clip as the third segment of the video edit, and/or other video clip(s) as other segment(s) of the video edit.

A system that creates video edits may include one or more electronic storages, one or more processors, and/or other components. An electronic storage may store video information defining video content (including multiple video clips, such as a first video clip, a second video clip, a third video clip, and/or other video clips), feature information of video clips, metadata of video content, and/or other information. Video content may refer to media content that may be consumed as one or more videos/video clips. Video content may include one or more videos/video clips stored in one or more formats/containers, and/or other video content. Video content may have a progress length. Video content may define visual content viewable as a function of progress through the progress length of the video content. Visual content of the video content may be included within video frames of the video content.

The processor(s) may be configured by machine-readable instructions. Executing the machine-readable instructions may cause the processor(s) to facilitate creating video edits. The machine-readable instructions may include one or more computer program components. The computer program components may include one or more of a feature information component, a selection component, a recommended feature information component, a video edit component, and/or other computer program components.

The feature information component may be configured to obtain feature information of video clips, and/or other information. Feature information may characterize features of the video clips. For example, the feature information may include feature information of the first video clip, feature information of the second video clip, feature information of the third video clip, and/or other feature information of other video clips. In some implementations, the feature information of the video clips may characterize lengths of the video clips, visuals captured within the video clips, effects used in the video clips, motion of image capturing device(s) that captured the video clips, audio of the video clips, and/or other characteristics of the video clips.

The selection component may be configured to select one or more video clips as one or more segments of a video edit of the video content. The selection component may select one of the video clips as a given segment of the video edit. For example, the selection component may select the first video clip as the given segment of the video edit. The given segment of the video edit may be the beginning segment of the video edit, the ending segment of the video edit, or an intermediate segment of the video edit. The selection component may iteratively select at least some of the video clips as other segments of the video edit based on the feature information and recommended feature information obtained by the recommended feature information component and/or other information.

The recommended feature information component may be configured to obtain the recommended feature information and/or other information. The recommended feature information may be obtained from a recurrent neural network. The recommended feature information component may process the feature information of a particular video clip through the recurrent neural network. The particular video clip may have been selected by the selection component as a particular segment of the video edit. The recurrent neural network may output recommended feature information for a segment of the video edit adjacent to the particular segment. The segment may precede the particular segment in the progress length of the video edit. The particular segment may precede the segment in the progress length of the video edit.

For example, based on the selection of a first video clip as a first segment of the video edit by the selection component, the recommended feature information component may process the feature information of the first video clip through the recurrent neural network. The recurrent neural network may output recommended feature information for a second segment of the video edit. The second segment may be adjacent to the first segment in the video edit. The selection component may select a second video clip as a second segment of the video edit based on a match between the recommended feature information for the second segment of the video edit and the feature information of the second video clip, and/or other information.

In some implementations, the match between the recommended feature information for the second segment of the video edit and the feature information of the second video clip may include the feature information including same feature values as the recommended feature information. In some implementations, the match between the recommended feature information for the second segment of the video edit and the feature information of the second video clip may include feature values of the feature information of the second video clip being closer to feature values of the recommended feature information for the second segment of the video edit than feature values of the feature information of other video clips (e.g., third video clip). That is, the second video clip may be matched to the second segment of the video edit based on the feature information of the second video clip being closer to the recommended feature information than other feature information of other video clips.

Based on the selection of the second video clip as the second segment of the video edit by the selection component, the recommended feature information component may process the feature information of the second video clip through the recurrent neural network. The recurrent neural network may output recommended feature information for a third segment of the video edit. The third segment may be adjacent to the second segment in the video edit. The selection component may select a third video clip as a third segment of the video edit based on a match between the recommended feature information for the third segment of the video edit and the feature information of the third video clip, and/or other information.

In some implementations, the selection component may be configured to edit a video clip based on recommended feature information. For example, the selection component may edit the second video clip based on the recommended feature information for the second segment of the video edit. The selection component may edit the video clip such that the feature information of the edited video clip is closer to the feature values of the recommended feature information than the feature information of the original video clip. For example, the selection component may edit the second video clip such that the edited second video clip is characterized by edited feature information, where feature values of the edited feature information are closer to feature values of the recommended feature information for the second segment of the video edit than feature values of the feature information of the original second video clip.

In some implementations, the selection component may be configured to select another video clip as the first segment of the video edit based on the recommended feature information for the second segment of the video edit not matching any of the feature information of the video clips. For example, the selection component may select the second video clip, the third video clip, or another video clip as the first segment of the video edit.

In some implementations, the iterative selection of at least some of the video clips as other segments of the video edit may end based on the recommended feature information characterizing an end of the video edit. The recommended feature information outputted by the recurrent neural network may characterize an end of the video edit and the selection component may end its selection of video clips as segments of the video edit.

The video edit component may be configured to generate video edit information and/or other information. The video edit information may define the video edit of the video content. The video edit may have a progress length. The video edit may include the video clips selected by the selection components as the segments of the video edit. For example, the selected video clips may include the first video clip as the first segment, the second video clip as the second segment, the third video clip as the third segment of the video edit, and/or other video clips as other segments of the video edit.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
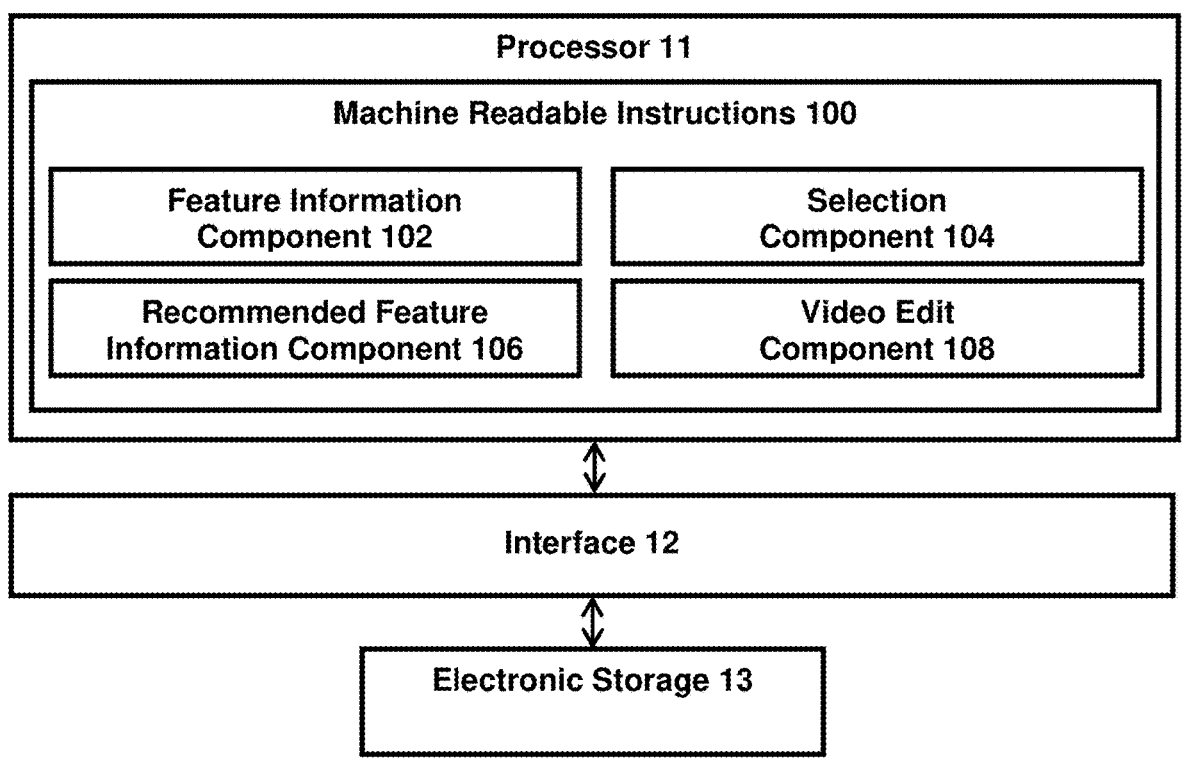
FIG. 1 illustrates a system that creates video edits.

FIG. 1 illustrates a system 10 for creating video edits. The system 10 may include one or more of a processor 11, an interface 12 (e.g., bus, wireless interface), an electronic storage 13, and/or other components. The electronic storage 13 may store video information defining video content. The video content may include video clips. The video clips may include a first video clip, a second video clip, a third video clip, and/or other video clips. Feature information of the video clips may be obtained by the processor 11. The feature information may characterize features of the video clips. The feature information may include first feature information of the first video clip, second feature information of the second video clip, third feature information of the third video clip, and/or other feature information. The first video clip may be selected as a first segment of a video edit of the video content. At least some of the video clips may be iteratively selected as other segments of the video edit based on the feature information, recommended feature information, and/or or other information.

Iterative selection of at least some of the video clips as the other segments of the video edit may include processing the first feature information through a recurrent neural network. The recurrent neural network may output first recommended feature information for a second segment of the video edit. The second segment may be adjacent to the first segment in the video edit. The second video clip may be selected as the second segment of the video edit based on a match between the first recommended feature information and the second feature information. The second feature information may be processed through the recurrent neural network. The recurrent neural network may output second recommended feature information for a third segment of the video edit. The third segment may be adjacent to the second segment in the video edit. The third video clip may be selected as the third segment of the video edit based on a match between the second recommended feature information and the third feature information.

Video edit information may be generated. The video edit information may define the video edit of the video content. The video edit may have a progress length. The video edit may include the selected video clips as the segments of the video edit. The selected video clips may include the first video clip as the first segment, the second video clip as the second segment, the third video clip as the third segment of the video edit, and/or other video clip(s) as other segment(s) of the video edit.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information defining video content, video content, feature information of the video clips, recommended feature information, video edit information defining a video edit, metadata of video content, and/or other information.

Video content may refer to media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may include a video clip captured by an image capture device (including one or more image sensors and one or more optical elements that guide light to the image sensor(s)), multiple video clips captured by an image capture device, and/or multiple video clips captured by different image capture devices. Video content may include multiple video clips captured at the same time and/or multiple video clips captured at different times. Video content may include a video clip processed by a video application, multiple video clips processed by a video application, and/or multiple video clips processed by different video applications.

Video content may have a progress length. A progress length may be defined in terms of time durations and/or number of video frames. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and number of video frames are contemplated. Video clips included in the video content have the same progress length and/or different progress lengths.

Video content may define visual content viewable as a function of progress through the progress length of the video content. Visual content of the video content may be included within video frames of the video content. In some implementations, video content may include one or more spherical video content, virtual reality content, and/or other video content. Spherical video content and/or virtual reality content may define visual content viewable from a point of view as a function of progress.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate creating video edits. The machine-readable instructions 100 may include one or more computer program components. The machine-readable instructions 100 may include one or more of a feature information component 102, a selection component 104, a recommended feature information component 106, a video edit component 108, and/or other computer program components.

The feature information component 102 may be configured to obtain feature information of video clips and/or other information. For example, referring to FIG. 3A, the feature information component 102 may obtain feature information of a video clip A 302, a video clip B 304, a video clip C 306, a video clip D 308, and/or other video clips. Obtaining feature information may include one or more of accessing, acquiring, analyzing, determining, examining, loading, locating, opening, receiving, retrieving, reviewing, storing, and/or otherwise obtaining the feature information. The feature information component 102 may obtain the feature information from one or more locations. For example, the feature information component 102 may obtain feature information from a storage location, such as the electronic storage 13, electronic storage of information and/or signals generated by one or more sensors, electronic storage of a device accessible via a network, and/or other locations. The feature information component 102 may obtain feature information from one or more hardware components (e.g., a sensor) and/or one or more software components (e.g., software running on a computing device).

The feature information component 102 may obtain feature information during acquisition of the video clips and/or after acquisition of the video clips by one or more image sensors/image capture devices. For example, the feature information component 102 may obtain feature information of a video clip while the video clip is being captured by one or more image sensors. The feature information component 102 may obtain feature information of a video clip after the video clip has been captured and stored in memory (e.g., the electronic storage 13).

Obtaining feature information of the video clips may include obtaining previously determined feature information of the video clip and/or determining the feature information of the video clips. For example, feature information of a video clip may have been determined previously and the feature information component 102 may obtain the determined feature information of the video clip. The feature information component 102 may analyze the video clip and/or information associated with the video clip to determine the feature information of the video clip. For example, the feature information component 102 may analyze the visual content within the video clip, audio content within the video clip, sensor information characterizing the video clip (e.g., sensor information generated by one or more sensors, such as motion sensor, location sensor, and/or other sensor, during the capture of the video clip), and/or other information associated with the video clip to determine the feature information of the video clip.

In some implementations, obtaining feature information of the video clips may include segmenting the video content into the video clips and obtaining feature information of the segmented video clips. The video content may be segmented into video clips of same progress length and/or video clips of different progress lengths. For example, referring to FIG. 3B, video content 320 may be segmented into video clips 322, 324, 326, 328, where the video clips 322, 324, 326, 328 have the same progress length. Referring to FIG. 3C, video content 340 may be segmented into video clips 342, 344, 346, where the video clips 342, 344, 346 have different progress lengths. Other segmentation of video content are contemplated.

In some implementations, the video content may be segmented into video clips based on similarity of content captured within the video clips. For example, one or more of visual content within the video content, audio content within the video content, sensor information characterizing the video content, and/or other information associated with the video content may be analyzed to determine which portions of the video content contain similar content (e.g., capture of same activity, event, object, scene) and segment the video content into video clips containing different content. For example, the video content may include capture of a person on a biking trip in which the person rides through a forest, rides along a cliff, and performs jumps/tricks. The video content may be segmented into a video clip of the ride through the ride, a video clip of the ride along the clip, and individual video clips of particular jumps/tricks. Other segmentation of video content into video clips are contemplated.

In some implementations, obtaining feature information of video clips may include obtaining feature information for particular spatial portions of the video content/the video clips. For example, the video content/the video clips may include spherical video capture and the visual content of the spherical video capture at individual moments may be captured within spherical video frames. That is, a spherical video frame at a moment in the progress length of the video content may include a spherical view (e.g., complete spherical view/partial spherical view) of the captured content.

Feature information for spherical video content may be consistent for a moment in the progress length of the spherical video content and/or for a particular spatial portion of a spherical video content (e.g., a particular portion/punch-out of a spherical video frame). Obtaining feature information of the entire spherical view of a spherical video frame/content may result in feature information for interesting spatial portions of the spherical video frame/content being lost (e.g., hidden, averaged out) due to feature information for non-interesting spatial portions of the spherical video frame/content. Feature information for spherical video content/spherical video clips may be obtained based on identification of a path through the spherical video content/spherical video clips that tracks/follows one or more targets of interest (e.g., activity, event, object, scene of interest) through the spherical video content/spherical video clips. Feature information obtained for spherical video content/spherical video clips may include the feature information of/associated with portions/punch-outs of spherical video frames that include the target(s) of interest.

In some implementations, the feature information may be obtained based on user interaction with a user interface/application (e.g., video editing application), and/or other information. For example, a user interface/application may provide option(s) for a user to select one or more video clips for use/potential use within a video edit. The feature information of the video clips may be obtained based on the user's selection of the video clips through the user interface/video application. For example, a user may use the user interface/application to select particular video clip file(s), select particular video content file(s) in which video clips are to be found/segmented, select particular location(s) (e.g., drive, folder, network path) in which video content/video clips are stored, and/or select other option(s) relating to obtaining feature information.

Feature information may characterize features of the video clips. Features of a video clip may refer to one or more attributes or aspects of the video clip that may distinguish the video clip from other video clips. Features of a video clip may relate to visual attributes/aspects and/or non-visual attributes/aspects of the video clip. For example, features of video clips may include progress length of video clips (e.g., time duration, number of video frames), visuals (e.g., identity, quantity, and/or quality of content within the video frames) captured within video clips, audio captured within video clips, effects used in the video clips (e.g., slow-motion, speed ramp, image blur/warping, color/brightness/contrast alteration, change in image projection, zooming), motion of image capturing device(s) that captured the video clips (e.g., translational motion, rotational motion during video capture), audio of the video clips (e.g., energy, frequency, pattern, voice command/), and/or other features/characteristics of video clips.

Figure 3A:
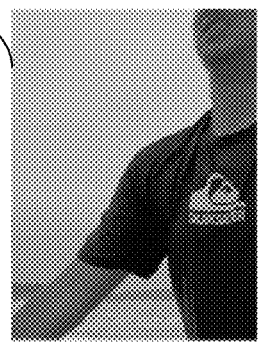
FIGS. 3A-3C illustrate example video clips.
Figure 3A:
Figure 3A:
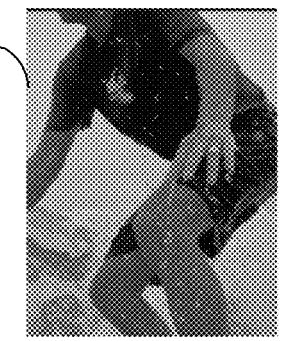
Figure 3A:
Figure 3B:
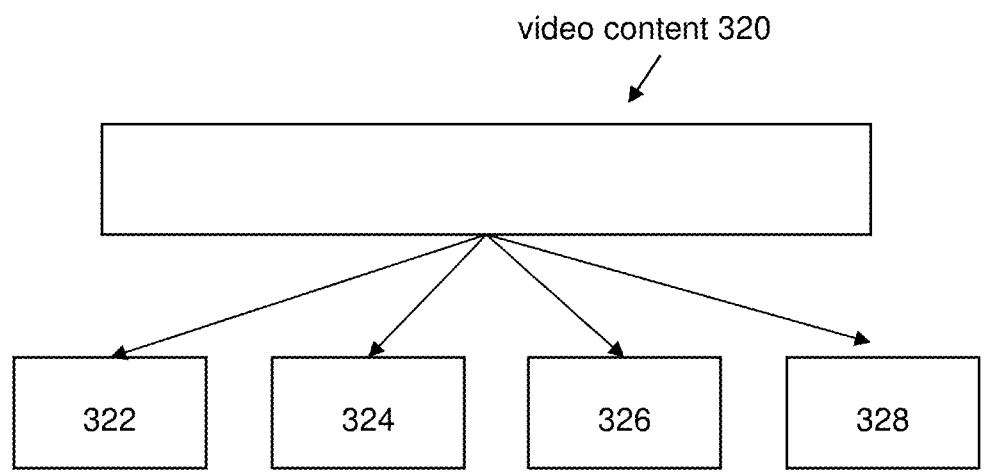
Figure 3C:
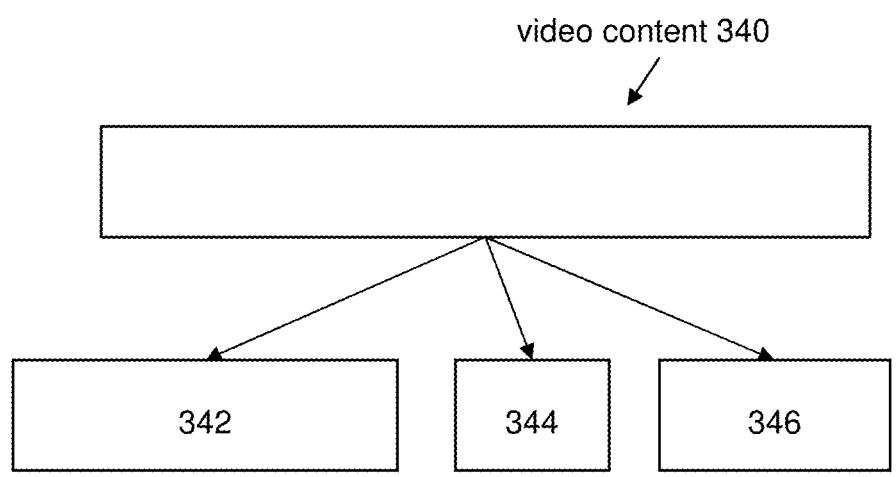

For example, referring to FIG. 3A, the feature information obtained by the feature information component 102 may include feature information of the video clip A 302, feature information of the video clip B 304, feature information of the video clip C 306, feature information of the video clip D 308, and/or other feature information. The feature information of the video clip A 302 may characterize features A 303 of the video clip A 302, the feature information of the video clip B 304 may characterize features B 305 of the video clip B 304, the feature information of the video clip C 306 may characterize features C 307 of the video clip C 306, and the feature information of the video clip D 308 may characterize features D 309 of the video clip D 308. The features 303, 305, 307, 309 of the video clips 302, 304, 306, 308 may be quantified by one or more metrics, such as metrics relating to shakiness (e.g., shakiness of visuals within a video clip), jumps (e.g., jumps in the video clip, jumps during the capture of the video clip), faces (e.g., faces in the video clip, particular faces in the video clip), saliency (e.g., salient activity, event, object, scene in the video clip), motion (e.g., motion captured in the video clip, motion of the image capture device(s) that captured the video clip), abrupt changes (e.g., abrupt audio changes), audio (e.g., voice, cheering), horizon (e.g., horizon captured in the video clip), and/or other characteristics of the video clips.

In some implementations, metrics quantifying features of the video clips may indicate a probability that the video clips include a particular feature (e.g., include a visual capture of a particular object, a particular scene, a particular action, a particular luminance/color), and/or other information. For instance, the metrics may include a values (e.g., saliency measure) indicating a probability that the video clips include a particular person, a particular sporting activity/movement, a particular emotion (e.g., laughing, smiling, excited), and/or other information. Other probabilities are contemplated.

In some implementations, metrics quantifying features of the video clips may indicate one or more measurements of one or more characteristics of the video clips that quantifies user interest. For example, the metrics may include one or more values indicating measurement(s) of intensities of visuals and/or audios captured within the portions, activities/events captured within the portions, and/or other information. Other metrics are contemplated.

Referring back to FIG. 1, the selection component 104 may be configured to select one or more video clips as one or more segments of a video edit of the video content. A video edit of the video content may refer to a particular arrangement and/or manipulation of one or more portions (e.g., video clips) of the video content. For example, the selection component 104 may make a first selection one of the video clips (e.g., the video clip A 302, the video clip B 304, the video clip C 306, the video clip D 308) as a given segment of the video edit. The given segment of the video edit may be the beginning (e.g., first) segment of the video edit, the ending (e.g., last) segment of the video edit, or an intermediate (e.g., between first and last) segment of the video edit. The selection component 104 may make the first selection based on user input, feature information, or other information. For example, the selection component 104 may receive a selection by a user of a particular video clip to be used in the first selection of the video clips. The selection component 104 may make the first selection based on feature information of the selected video clip matching one or more criteria. The selection component 104 may make the first selection based on random selection. Other first selection of the video clips as a given segment of the video edit are contemplated.

The selection component 104 may iteratively select some or all of the video clips as other segments of the video edit based on the feature information and recommended feature information obtained by the recommended feature information component 106 and/or other information. The recommended feature information may characterize features of a video clip recommended/suggested to be selected for a segment adjacent to a previously filled segment of the video edit.

Figure 4:
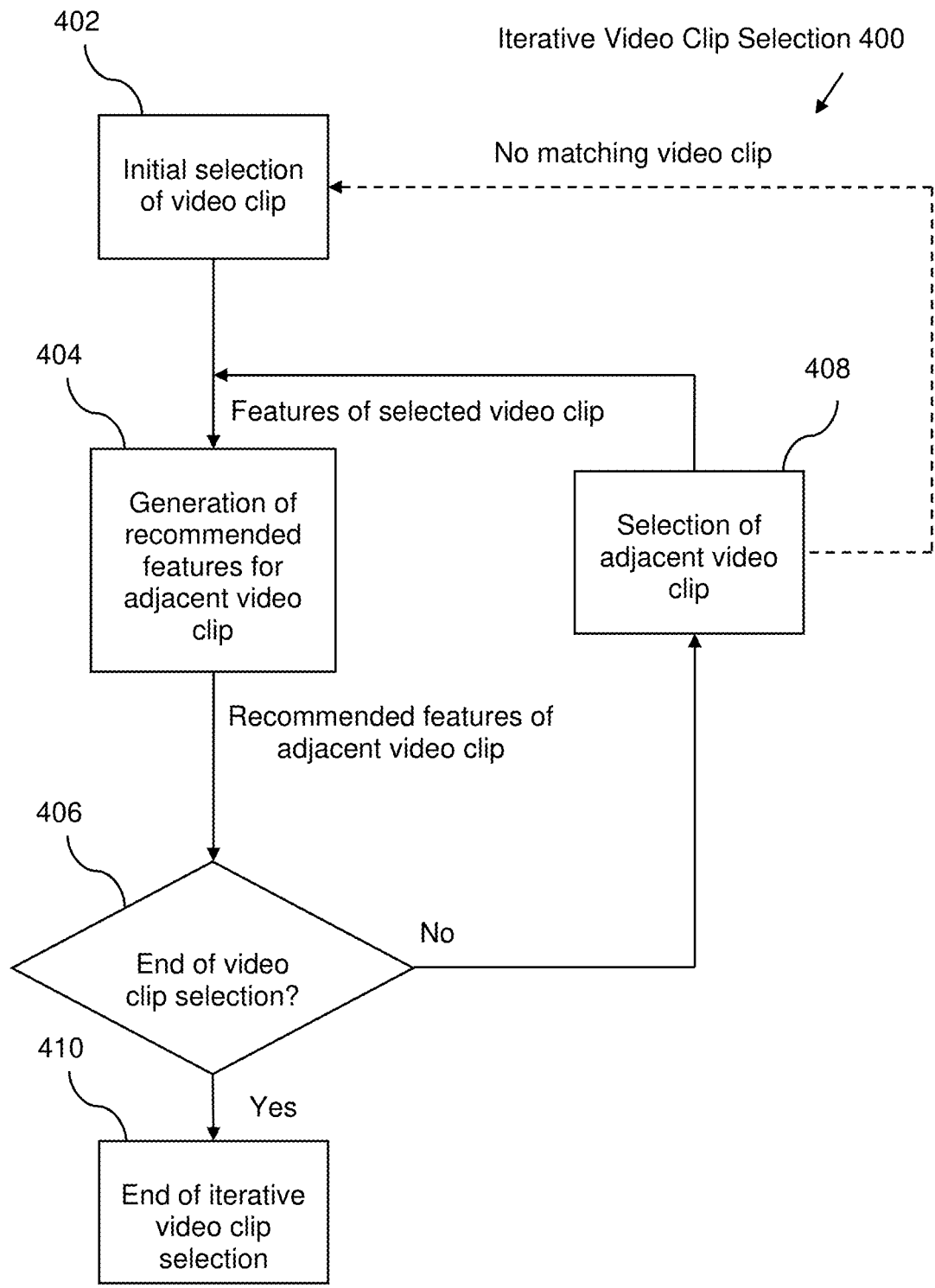
FIG. 4 illustrates an example flow for iterative selection of video clips.

FIG. 4 illustrates an example flow for iterative video clip selection 400. At step 402, an initial selection of a video clip as a given segment of the video edit may be made. The given segment may include the beginning (e.g., first) segment of the video edit, the ending (e.g., last) segment of the video edit, or an intermediate (e.g., between first and last) segment of the video edit. At step 404, features of the selected video clip may be used to generate recommended features of an adjacent video clip—the video clip recommended/suggested to be selected for a segment of the video edit adjacent to the given segment of the video edit. The segment of the video edit adjacent to the given segment of the video edit may be a segment preceding the given segment or a segment following the given segment.

At step 406, based on the recommended features of the adjacent video clip, it may be determined whether the end of video clip selection has been reached. If the recommended features of the adjacent video clip characterizes (e.g., recommends/suggests) an end to the video clip selection (e.g., the previously selected video clip is a good clip to end the video edit, such as a video clip of a setting sun), the iterative video clip selection may be ended at step 410. If the recommend features of the adjacent video clip does not recommends/suggests an end to the video clip selection, the adjacent video clip may be selected at step 408. The iterative video clip selection 400 may return to step 404, where the features of the last selected video clip are used to generate recommended features for an adjacent video clip.

In some implementations, the recommended features of adjacent video clips may not match features of any video clips. If the previous selection of the video clip was the initial selection of video clip in step 402, the iterative video clip selection 400 may return to step 402 where a different video clip may be chosen as the initial selection of the video clip in the video edit. That is, if the first video clip chosen as a segment of the video edit results in the recommended feature of the adjacent video clip not matching any available video clip, then the first video clip chosen as the segment of the video edit may be replaced with another video clip. Otherwise, the video edit may include only one video clip.

In some implementations, the iterative video clip selection 400 may end based on recommended features of adjacent video clips not matching features of any video clips and there being sufficient number of prior selections of video clips. For example, a video edit may require a certain threshold number of video clips (e.g., four video clips). The iterative video clip selection 400 may result in selection of video clips satisfying the threshold number of video clips (e.g., four or more video clips). The iterative video clip selection 400 may then result in the recommended features of adjacent video clips not matching features of any video clips. Based on the video edit having enough number of video clips, the iterative video clip selection 400 may end. If the video edit does not have enough number of video clips (e.g., three or less video clips), the previously selected video clip may be replaced with another video clip.

In some implementations, the iterative video clip selection 400 may end based on a maximum number of video clips being selected for a video edit. For example, a video edit may be limited to a certain number of video clip and/or a certain progress length and enough video clips may have been selected to meet the maximum video clip numbers and/or maximum progress length (the combined progress lengths of the selected video clips), and the iterative video clip selection 400 may be ended.

Referring back to FIG. 1, the recommended feature information component 106 may be configured to obtain the recommended feature information and/or other information. The recommended feature information may characterize features of a video clip recommended/suggested to be selected for a segment adjacent to a previously filled segment of the video edit. That is, the recommended feature information obtained by the recommended feature information component 106 may characterize features of a video clip recommended/suggested to be selected for a segment adjacent to the last segment for which the selection component 104 selected the video clip.

The recommended feature information may be obtained from one or more recurrent neural networks, and/or other source(s). A recurrent neural network may refer to an artificial neural network with connections between units forming a directed graph along a sequence. A recurrently neural network may use its internal state (memory) to process sequences of inputs. Rules of a recurrent neural network may be learned through training on one or more sets of inputs/outputs. For example, a recurrent neural network may be trained on one or more sets of features information for available video clips and one or more sets of selected video clips for inclusion in video edits (trained using decisions made on prior selection of video clips).

The recommended feature information component 106 may process the feature information of a particular video clip (video clip previously selected by the selection component 104 for a particular segment of the video edit) through the recurrent neural network. The recurrent neural network may output recommended feature information for a given segment of the video edit adjacent to the particular segment. The given segment may precede the particular segment in the progress length of the video edit, or the particular segment may precede the given segment in the progress length of the video edit. The recurrent neural network may use the feature information from the prior video clip selection to recommend/suggest the next expected video clip. For a given segment in the video clip, the recurrent neural network may take into account one or more of the prior video clip selections into account. For example, the video clip chosen in the initial video clip selection for a first segment in the video edit may have a greater impact on the determination of recommended feature information for a second segment in the video edit than in a fifth segment in the video edit. In some implementations, the impact of a given video clip selection for a segment in the video clip may decrease exponentially for each subsequent video clip selection.

In some implementations, a recurrent neural network may include one or more gated recurrent units (GRU) and long short-term memory (LSTM) units. Such units may include a decision process to store information for future use. Information stored in LSTM or GRU may be used for generating recommended feature information. For example, a particular video clip selected for use in a video edit may include a close-up of a particular person (identified using facial recognition). This information may be stored in the LSTM or GRU such that a subsequent clip chosen for the video edit may be recommended to include the same person.

A recurrent neural network may be trained using inputs/outputs associated with particular users, using inputs/outputs associated with particular groups of users, inputs/outputs associated with particular theme/story/activity, or inputs/outputs associated with general users/theme/story/activity. For example, training a recurrent neural network with inputs/outputs associated with a particular user may enable the recurrent neural network to suggest video clip selection for the particular user based on prior video clip selection by the user. Such a recurrent neural network may suggest video clips for inclusion and the ordering of the video clips based on the editing style of the user. Training a recurrent neural network with inputs/outputs associated with a particular group of users may enable the recurrent neural network to suggest video clip selection for the particular groups of users based on prior video clip selection by the groups of users. Such a recurrent neural network may suggest video clips for inclusion and the ordering of the video clips based on the editing style of the groups of users. Training a recurrent neural network with inputs/outputs associated with a particular theme/story/activity (e.g., action video edit, peaceful video edit) may enable the recurrent neural network to suggest video clip selection for the particular theme/story/activity based on prior video clip selection for the particular theme/story/activity. Such a recurrent neural network may suggest video clips for inclusion and the ordering of the video clips based on the editing style associated with the particular theme/story/activity. The recurrent neural network may be updated with new selection of video clips to update the rules by which it operates. Other types of training of recurrent neural network (e.g., based on different directing style, different cinematography, different transitions between video clips) are contemplated.

For example, based on training, a recurrent neural network may suggest the following video clips to be selected in sequence for a video edit to provide a story of surfing: (1) a video clip which includes a wide shot, (2) a video clip zooming in on person(s), (3) a video clip including person(s) walking to the beach, (4) a video clip including person(s) paddling, (5) a video clip including person(s) surfing, (6) a video clip including a close-up of person(s), (7) a video clip including person(s) getting out of water, (8) a video clip including a wide shot, and/or other video clips. Based on training, a recurrent neural network may suggest the following video clips to be selected in sequence for a video edit to provide a video edit with different playback speeds for a particularly exciting action: (1) a video clip with a normal playback speed, (2) a video clip featuring the same action as the previous clip but with reduced playback speed, (3) a video clip with a speed ramp, (4) a video clip with normal playback speed, and/or other video clips. Other suggestion of video clips are contemplated.

Use of recurrent neural network for video clip selection may enable personalized and/or dynamic video edit creation based on users, groups of users, desired style of video edit, and/or other information. Rather than manually choosing among video clips, video clips may be automatically selected/recommended for selection based on previous selection of video clips. Rather than using static video templates (including slots that specify the type of video clip to be selected for the slots) which may lead to video edits feeling redundant, contextual information relating to video clip selections may be used to create more natural and varied video edits.

Figure 5:
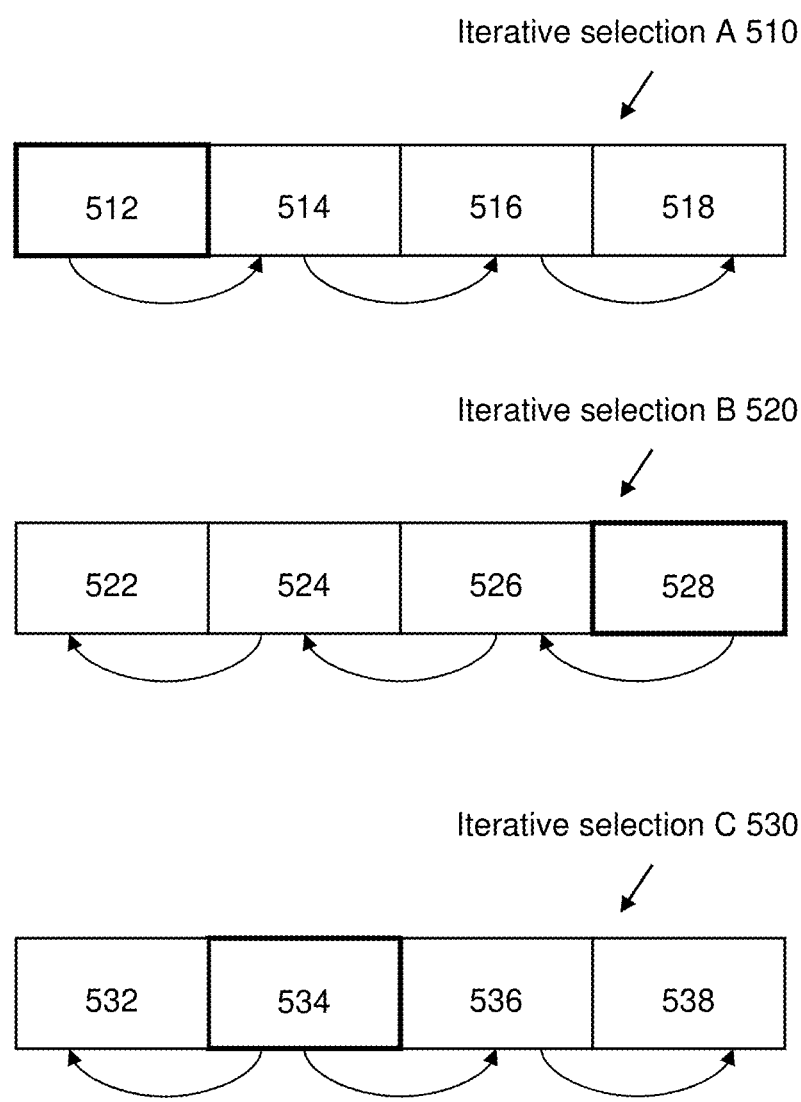
FIG. 5 illustrates iterative selections of video clips.

FIG. 5 illustrates example iterative selections of video clips. In an iterative selection A 510, a video clip 512 may be selected by the selection component 104 as a beginning segment of a video edit. The recommended feature information component 106 may process the feature information of the video clip 512 through the recurrent neural network, and the recurrent neural network may output recommended feature information for a second segment of the video edit. The second segment may be adjacent to the beginning segment in the video edit. The selection component 104 may select a video clip 514 as the second segment of the video edit based on the recommended feature information for the second segment of the video edit, the feature information of the video clip 514, and/or other information. For example, the selection component 104 may select the video clip 514 as the second segment of the video edit based on a match between the recommended feature information for the second segment of the video edit and the feature information of the video clip 514. The iterative selection A 510 may continue such that the recommended feature information for the third segment of the video edit may be obtained based on processing the feature information of the video clip 514 through the recurrent neural network and the video clip 516 may be selected as the third segment of the video edit based on a match between the recommended feature information for the third segment and the feature information of the video clip 516. The recommended feature information for the fourth segment of the video edit may be obtained based on processing the feature information of the video clip 516 through the recurrent neural network and the video clip 518 may be selected as the fourth segment of the video edit based on a match between the recommended feature information for the fourth segment and the feature information of the video clip 518.

In an iterative selection B 520, the sequence of selection of video clips as segments of a video edit may be reversed. In the iterative selection B 520, a video clip 528 may be selected by the selection component 104 as an ending segment of a video edit. Recommended feature information for adjacent segments of the video edits may be obtained based on processing of feature information of selected video clips and the adjacent video clips may be selected based on matches between the recommended feature information of segments and the feature information of video clips such that a video clip 526 is selected as an adjacent segment, followed by a video clip 524, and followed by a video clip 522.

In an iterative selection C 530, the sequence of selection of video clips as segments of a video edit may go in both directions. In the iterative selection C 530, a video clip 534 may be selected by the selection component 104 as an intermediate segment of a video edit. Recommended feature information for adjacent segments of the video edits may be obtained based on processing of feature information of selected video clips and the adjacent video clips may be selected based on matches between the recommended feature information of segments and the feature information of video clips such that a video clip 532 is selected as an adjacent segment preceding the segment for which the video clip 534 was selected, a video clip 536 is selected as an adjacent segment following the segment for which the video clip 534 was selected, followed by a video clip 638.

The recommended feature information for the segments preceding and following the segment for which the video clip 534 was selected may be generated based on processing the feature information of the video clip 534 through one or more recurrent neural networks. Based on the ordering of the video clips being selected, the recurrent neural network(s) may output different recommended feature information. That is the recurrent neural network(s) may output different recommended feature information based on whether the segment to be selected is a segment preceding or following the segment for which video clip selection has been previously made. In some implementations, the recommended feature information component 106 may process the feature information of a given video clip through different recurrent neural network/differently trained recurrent neural network based on the ordering of the video clips being selected. That is, a particular recurrent neural network may be built/trained for recommending feature information of subsequent video segments in a video edit while another recurrent neural network may be built/trained recommending feature information of preceding video segments in the video edit.

In some implementations, a match between recommended feature information for a given segment of the video edit and feature information of a given video clip may include the feature information including same feature values as the recommended feature information. Feature values may refer to values of metrics that quantify features of video clips and/or recommended video clips. That is, the feature information of a given video clip may include one or more feature values to quantify the features of the video clip and the recommended feature information may include one or more feature values to quantify the features of the video clip recommended for a given segment. In some implementations, a match between recommended feature information for a given segment of the video edit and feature information of a given video clip may include feature values of the feature information of the given video clip being closer to feature values of the recommended feature information for the given segment of the video edit than feature values of the feature information of other video clips. That is, the given video clip may be matched to the given segment of the video edit based on the feature information of the given video clip being closer to the recommended feature information than other feature information of other video clips.

Figure 6A:
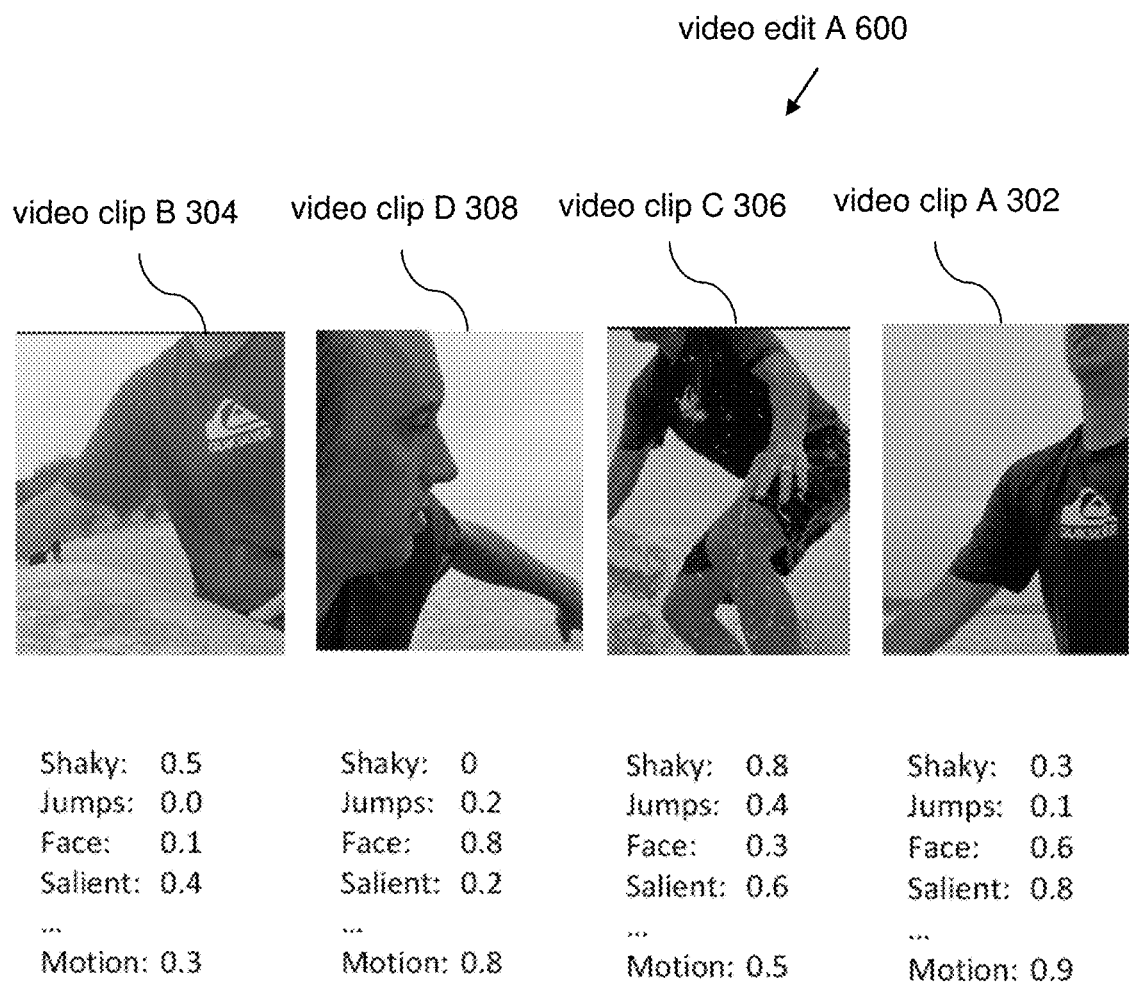
FIGS. 6A-6B illustrate example video clips selected for inclusion in video edits.

For example, FIG. 6A illustrates example video clips 302, 304, 306, 308 selected for inclusion in a video edit A 600. The video clip B 304 may be positioned at the beginning of the video edit A 600, followed by the video clip D 308, the video clip C 306, and then the video clip A 302. The video clip B 304 may have been selected in the initial selection of video clips for the video edit A 600. The selection of the video clip D 308 as a second segment in the video edit A 600 may be based on the feature values of the video clip D 308 being the same as the feature values of the recommended feature information for the second segment and/or based on the feature values of the video clip D 308 being closer to the feature values of the recommended feature information for the second segment than the feature values of the video clip C 306 or the feature values of the video clip A 302.

In some implementations, video clip selected in the initial selection of the video clips for the video edit A 600 may be changed. For example, the video clip A 302 may have been selected in the initial selection of video clips for the video edit A 600. The recommended feature information generated based on processing of the feature information of the video clip A 302 through a recurrent neural network may not match the feature information of the video clip B 304, the video clip C 306, or the video clip D 308. Based on none of the feature information of the available video clips 304, 306, 308 matching the recommended feature information, another video clip (e.g., the video clip B 304) may be used for the initial selection of video clips for the video edit A 600.

In some implementations, the iterative selection of some or all the available video clips as segments of the video edit A 600 may end based on the recommended feature information characterizing an end of the video edit and/or other information. That is, the recommended feature information outputted by the recurrent neural network may characterize an end of the video edit A 600 and the selection of video clips as segments of the video edit A 600 may be ended. Other termination of the iterative selection of video clips as segments of video edits are contemplated.

In some implementations, the selection component 104 may be configured to edit one or more video clips based on recommended feature information and/or other information. The selection component 104 may edit a video clip such that the feature information of the edited video clip is closer to the feature values of the recommended feature information than the feature information of the original video clip.

Figure 6B:
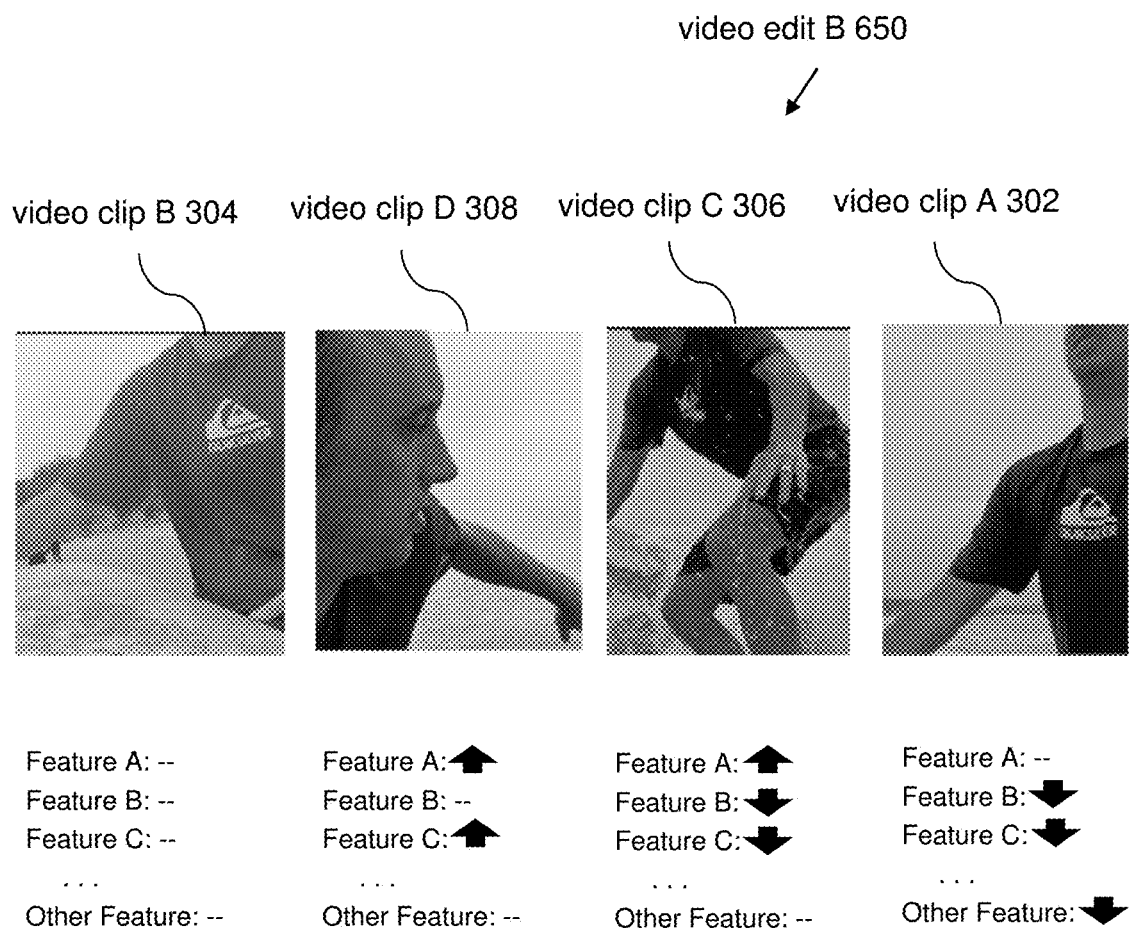

For example, FIG. 6B illustrates example video clips 302, 304, 306, 308 selected for inclusion in a video edit B 650. The video clip B 304 may be positioned at the beginning of the video edit A 600, followed by the video clip D 308, the video clip C 306, and then the video clip A 302. The video clip B 304 may have been selected in the initial selection of video clips for the video edit B 650. The selection of the video clip D 308 as a second segment in the video edit B 650 may be based on the feature values of the video clip D 308 being closer to the feature values of the recommended feature information for the second segment than the feature values of the video clip C 306 or the feature values of the video clip A 302. The feature values of the video clip D 308, however, may not be the same as the feature values of the recommended feature information for the second segment.

The selection component 104 may edit the video clip D 308 based on the recommended feature information for the second segment of the video edit B 650 and/or other information. For example, the selection component 104 may edit the video clip D 308 such that the edited version of the video clip D 308 is characterized by edited feature information. Feature values of the edited feature information may be closer to the feature values of the recommended feature information for the second segment of the video edit B 650 than feature values of the feature information of the original version of the video clip D 308. For instance, the selection component 104 may modify the video clip D 308 to increase the feature values of features A and C. Likewise, the selection component 104 may modify the video clip C 306 to increase the feature value of feature A and to decrease the feature values of features B and C so that the edited version of the video clip C 306 has feature values closer to the feature values of the recommended feature information for the third segment of the video edit B 650 than the feature values of the original version of the video clip C 306, and the selection component 104 may modify the video clip A 302 to decrease the feature values of features A and B and other features so that the edited version of the video clip A 302 has feature values closer to the feature values of the recommended feature information for the fourth segment of the video edit B 650 than the feature values of the original version of the video clip A 302.

Edits to the video clips made by the selection component 104 may include one or more of changes to visuals contained within the video clips, audio contained within the video clip, playback rates of the video clips, and/or other changes to the video clips. For example, a particular video clip may be edited to increase/reduce shakiness/motion in the video clip. A particular video clip may be edited to include particular effects (e.g., slow-motion, speed ramp, image blur/warping, color/brightness/contrast alteration, change in image projection, zooming). For example, a feature of a suggested video clip may include zooming in on a person's face. A given video clip available for selection may include a capture of the person's entire body. The selection component 104 may edit the given video clip to include zooming in on the person's face so that the edited video clip better matches the suggested features. Other edits to video clips are contemplated.

In some implementations, the selection component 104 may provide multiple video clips matching the recommended feature information for selection by a user. For example, the selection component 104 may offer multiple video clips that match the recommended feature information for selection by a user, or may offer a video clip that matches the recommended feature information for confirmation by the user.

Recommended feature information may be stored for future training/re-training of the recurrent neural network. For example, recommended feature information generated for a surfing video edit may be stored in the electronic storage 13 and/or other locations for retrieval. If the user has indicated a positive response to the surfing video edit (liked/shared/used/viewed positively) resulting from the recommended feature information, the recommended feature information may be used as a positive example for training/re-training the recurrent neural network. In some implementations, recommended feature information for video edits may be stored for later use in generating video edits. For example, stored recommended feature information may be retrieved for reuse in creating another surfing video edit, which may make it unnecessary to process the feature information of selected clips to generate recommended feature information.

Referring back to FIG. 1, the video edit component 108 may be configured to generate video edit information and/or other information. The video edit information may define the video edit of the video content and/or other information. The video edit may have a progress length (defined in terms of time durations and/or number of video frames). The video edit may include the video clips selected by the selection components 104 as the segments of the video edit. For example, referring to FIG. 6A, the video edit component 108 may generate video edit information defining the video edit A 600. The video edit A 600 may include the video clips selected by the selection component 104 as the segments of the video edit A 600: the video clip B 304 as the first segment, the video clip D 308 as the second segment, the video clip C 306 as the third segment, and the video clip A 302 as the fourth segment of the video edit, and/or other video clips as other segments of the video edit.

The video edit information may define an encoded video content of the video edit and/or instructions for rendering the video content of the video edit. For example, the video edit information may define an encoded version of a particular video edit, and the video edit information (e.g., video file) may be opened in a video player for presentation. The video edit information may define instructions identifying arrangement and/or manipulation of one or more portions of video content included in the video edit. For example, the video information may define a director track that includes information as to which portions of the video content are included in the video edit and the order in which the portions are to be presented on playback. The instructions may define one or more effects to be used during playback of the video edit. A video player may use the director track to retrieve the portions of the video content included in the video edit when the video edit is opened/to be presented.

The video edit component 108 may be configured effectuate storage of the video edit information and/or other information in one or more storage media. For example, the video edit information may be stored in the electronic storage 13, remote storage locations (storage media located at/accessible through a server), and/or other locations. In some implementations, the video edit component 108 may effectuate storage of the video edit information through one or more intermediary devices. For example, the processor 11 may be located within a computing device without a connection to the storage device (e.g., the computing device lacks WiFi/cellular connection to the storage device). The video edit component 108 may effectuate storage of the video edit information through another device that has the necessary connection (e.g., the computing device using a WiFi/cellular connection of a paired mobile device, such as a smartphone, tablet, laptop, to store information in one or more storage media). Other storage locations for and storage of the video edit information are contemplated.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more cameras/image sensors to capture images/videos from a location. Spherical video content may be generated based on light received within a field of view of a single image sensor or within fields of view of multiple image sensors during a capture period. For example, multiple images/videos captured by multiple cameras/image sensors may be combined/stitched together to form the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical video content.

Visual content of the spherical video content may be included within spherical video frames of the spherical video content. For example, multiple images captured by multiple cameras/images sensors at a moment in time may be combined/stitched together to form a spherical video frame for the moment in time. A spherical video frame may include a full spherical image capture (360 degrees of capture, including opposite poles) or a particular spherical image capture (less than 360 degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with a resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular direction within the virtual reality content by looking in a particular direction. For example, a user may use a virtual reality headset to change the user's direction of view. The user's direction of view may correspond to a particular direction of view within the virtual reality content. For example, a forward-looking (e.g., north) direction of view for a user may correspond to a forward (e.g., north) direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
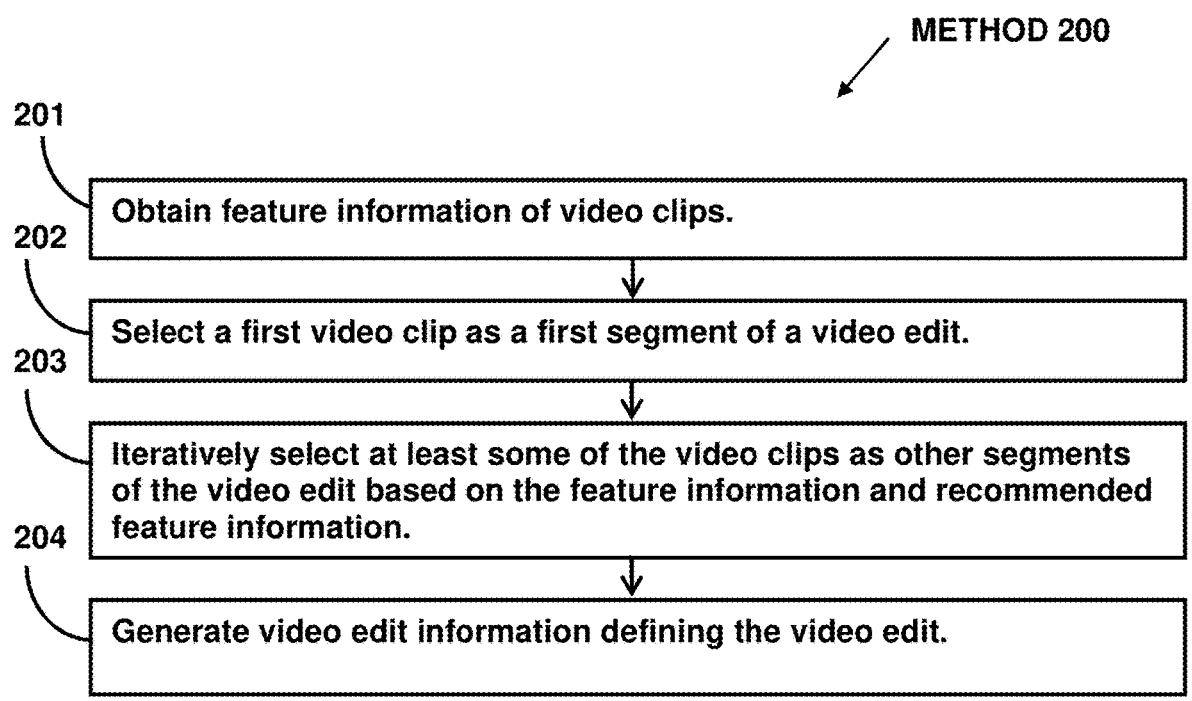
FIG. 2 illustrates a method for creating video edits.

FIG. 2 illustrates method 200 for creating video edits. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, feature information of video clips may be obtained. The video clips may include a first video clip, a second video clip, and a third video clip. The feature information may characterize features of the video clips. The feature information may include first feature information of the first video clip, second feature information of the second video clip, and third feature information of the third video clip. In some implementation, operation 201 may be performed by a processor component the same as or similar to the feature information component 102 (Shown in FIG. 1 and described herein).

At operation 202, the first video clip may be selected as a first segment of a video edit of video content. In some implementations, operation 202 may be performed by a processor component the same as or similar to the selection component 104 (Shown in FIG. 1 and described herein).

At operation 203, at least some of the video clips may be iteratively selected as other segments of the video edit based on the feature information and recommended feature information. Iterative selection of the video clips may include: processing the first feature information through a recurrent neural network, the recurrent neural network outputting first recommended feature information for a second segment of the video edit, the second segment adjacent to the first segment in the video edit; selecting the second video clip as the second segment of the video edit based on a match between the first recommended feature information and the second feature information; processing the second feature information through the recurrent neural network, the recurrent neural network outputting second recommended feature information for a third segment of the video edit, the third segment adjacent to the second segment in the video edit; and selecting the third video clip as the third segment of the video edit based on a match between the second recommended feature information and the third feature information. In some implementations, operation 203 may be performed by a processor component the same as or similar to the selection component 104 and/or the recommended feature information component 106 (Shown in FIG. 1 and described herein).

At operation 204, video edit information defining the video edit may be generated. The video edit may have a progress length. The video may edit include the selected video clips as the segments of the video edit. The selected video clips may include the first video clip as the first segment, the second video clip as the second segment, and the third video clip as the third segment of the video edit. In some implementations, operation 204 may be performed by a processor component the same as or similar to the video edit component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for creating video edits, the system comprising:
one or more physical processors configured by machine-readable instructions to:
obtain feature information of multiple video clips, the feature information including feature values that characterize features of the multiple video clips, the features of the multiple video clips including visuals captured within the multiple video clips, wherein the feature information includes first feature information of a first video clip, second feature information of a second video clip, and third feature information of a third video clip, further wherein the first video clip is selected as a first segment of a video edit of the video content;
iteratively select at least some of the multiple video clips as other segments of the video edit based on the feature information and recommended feature information, the recommended feature information for next segment of the video edit determined based on processing, through a recurrent neural network, the feature information of a video clip previously selected for inclusion in the video edit as an adjacent segment of the next segment, the recommended feature information including feature values that characterize recommended features of a video clip to be selected for inclusion in the video edit as the next segment, the recurrent neural network using the feature information from multiple ones of prior video clip selections to output the recommended feature information; and generate video edit information, the video edit information defining the video edit of the video content, the video edit having a progress length, the video edit including the selected video clips as the segments of the video edit.

2. The system of claim 1, wherein the iterative selection of the at least some of the video clips as the other segments of the video edit includes:

processing the first feature information through the recurrent neural network, the recurrent neural network outputting first recommended feature information for a second segment of the video edit, the first recommended feature information including feature values that characterize first recommended visual for the second segment of the video edit based on the first feature information including feature values that characterize first visual captured within the first video clip, the second segment adjacent to the first segment in the video edit;

selecting the second video clip as the second segment of the video edit based on a match between the feature values of the first recommended feature information that characterize the first recommended visual for the second segment of the video edit and feature values of the second feature information that characterize second visual captured within the second video clip;

processing the second feature information through the recurrent neural network, the recurrent neural network outputting second recommended feature information for a third segment of the video edit, the second recommended feature information including feature values that characterize second recommended visual for the third segment of the video edit based on the second feature information including the feature values that characterize the second visual captured within the second video clip, the third segment adjacent to the second segment in the video edit; and selecting the third video clip as the third segment of the video edit based on a match between the feature values of the second recommended feature information that characterize the second recommended visual for the third segment of the video edit and feature values of the third feature information that characterize third visual captured within the third video clip;

wherein the selected video clips include the first video clip as the first segment, the second video clip as the second segment, and the third video clip as the third segment of the video edit.

3. The system of claim 2, wherein the first segment precedes the second segment in the progress length of the video edit.

4. The system of claim 2, wherein the second segment precedes the first segment in the progress length of the video edit.

5. The system of claim 2, wherein the match between the feature values of the first recommended feature information and the feature values of the second feature information includes the second feature information including same feature values as the first recommended feature information.

6. The system of claim 2, wherein the match between the feature values of the first recommended feature information and the feature values of the second feature information includes the feature values of the second feature information being closer to the feature values of the first recommended feature information than the feature values of the third feature information.

7. The system of claim 2, wherein the one or more physical processors are further configured by the machine-readable instructions to select another video clip as the first segment of the video edit based on the feature values of the first recommended feature information for the second segment of the video edit not matching any feature values of the feature information of the video clips.

8. The system of claim 2, wherein the one or more physical processors are further configured by the machine-readable instructions to edit the second video clip based on the first recommended feature information to change one or more features of the second video clip and generate a modified second video clip that is closer to the first recommended feature information than the second video clip, the edited second video clip being characterized by edited second feature information different from the second feature information, wherein feature values of the edited second feature information are closer to the feature values of the first recommended feature information than the feature values of the second feature information.

9. The system of claim 1, wherein the iterative selection of the at least some of the video clips as the other segments of the video edit ends based on the recommended feature information outputted by the recurrent neural network based on processing of the feature information of the video clip previously selected for inclusion in the video edit recommending ending the video edit with the video clip previously selected for inclusion in the video edit.

10. The system of claim 1, wherein the feature information of the video clips further includes feature values that characterize effects used in the video clips, motion of one or more image capture devices that captured the video clips, and audio of the video clips.

11. A method for creating video edits, the method performed by a computer system including one or more processors, the method comprising:

obtaining, by the computing system, feature information of multiple video clips, the feature information including feature values that characterize features of the multiple video clips, the features of the multiple video clips including visuals captured within the multiple video clips, wherein the feature information includes first feature information of a first video clip, second feature information of a second video clip, and third feature information of a third video clip, further wherein the first video clip is selected as a first segment of a video edit of the video content;

iteratively selecting, by the computing system, at least some of the multiple video clips as other segments of the video edit based on the feature information and recommended feature information, the recommended feature information for next segment of the video edit determined based on processing, through a recurrent neural network, the feature information of a video clip previously selected for inclusion in the video edit as an adjacent segment of the next segment, the recommended feature information including feature values that characterize recommended features of a video clip to be selected for inclusion in the video edit as the next segment, the recurrent neural network using the feature information from multiple ones of prior video clip selections to output the recommended feature information; and generating, by the computing system, video edit information, the video edit information defining the video edit of the video content, the video edit having a progress length, the video edit including the selected video clips as the segments of the video edit.

12. The method of claim 11, wherein the iterative selection of the at least some of the video clips as the other segments of the video edit includes:

processing the first feature information through the recurrent neural network, the recurrent neural network outputting first recommended feature information for a second segment of the video edit, the first recommended feature information including feature values that characterize first recommended visual for the second segment of the video edit based on the first feature information including feature values that characterize first visual captured within the first video clip, the second segment adjacent to the first segment in the video edit;

selecting the second video clip as the second segment of the video edit based on a match between the feature values of the first recommended feature information that characterize the first recommended visual for the second segment of the video edit and feature values of the second feature information that characterize second visual captured within the second video clip;

processing the second feature information through the recurrent neural network, the recurrent neural network outputting second recommended feature information for a third segment of the video edit, the second recommended feature information including feature values that characterize second recommended visual for the third segment of the video edit based on the second feature information including the feature values that characterize the second visual captured within the second video clip, the third segment adjacent to the second segment in the video edit; and selecting the third video clip as the third segment of the video edit based on a match between the feature values of the second recommended feature information that characterize the second recommended visual for the third segment of the video edit and feature values of the third feature information that characterize third visual captured within the third video clip;

wherein the selected video clips include the first video clip as the first segment, the second video clip as the second segment, and the third video clip as the third segment of the video edit.

13. The method of claim 12, wherein the first segment precedes the second segment in the progress length of the video edit.

14. The method of claim 12, wherein the second segment precedes the first segment in the progress length of the video edit.

15. The method of claim 12, wherein the match between the feature values of the first recommended feature information and the feature values of the second feature information includes the second feature information including same feature values as the first recommended feature information.

16. The method of claim 12, wherein the match between the feature values of the first recommended feature information and the feature values of the second feature information includes the feature values of the second feature information being closer to the feature values of the first recommended feature information than the feature values of the third feature information.

17. The method of claim 12, further comprising selecting, by the computing system, another video clip as the first segment of the video edit based on the feature values of the first recommended feature information for the second segment of the video edit not matching any feature values of the feature information of the video clips.

18. The method of claim 12, further comprising editing, by the computing system, the second video clip based on the first recommended feature information to change one or more features of the second video clip and generate a modified second video clip that is closer to the first recommended feature information than the second video clip, the edited second video clip being characterized by edited second feature information different from the second feature information, wherein feature values of the edited second feature information are closer to the feature values of the first recommended feature information than the feature values of the second feature information.

19. The method of claim 11, wherein the iterative selection of the at least some of the video clips as the other segments of the video edit ends based on the recommended feature information outputted by the recurrent neural network based on processing of the feature information of the video clip previously selected for inclusion in the video edit recommending ending the video edit with the video clip previously selected for inclusion in the video edit.

20. The method of claim 11, wherein the feature information of the video clips further includes feature values that characterize effects used in the video clips, motion of one or more image capture devices that captured the video clips, and audio of the video clips.

* * * * *